July 14, 1942. E. H. LAND 2,289,715
COMPOSITE FILM FOR RECEIVING STEREOSCOPIC PRINTS
Filed June 7, 1940

INVENTOR
Edwin H. Land
BY
Donald L. Brown
Attorney

Patented July 14, 1942

2,289,715

UNITED STATES PATENT OFFICE 2,289,715

COMPOSITE FILM FOR RECEIVING STEREOSCOPIC PRINTS

Edwin H. Land, Boston, Mass., assignor to Polaroid Corporation, Dover, Del., a corporation of Delaware Application June 7, 1940, Serial No. 339,251

6 Claims. (Cl. 88—29)

This invention relates to a new and useful composite sheet or film comprising a plurality of sheet-like elements bonded together, each of said elements having its molecules oriented to substantial parallelism and the molecules of one of said elements being oriented in a direction at right angles to the direction of orientation of the molecules of the other of said elements.

An object of the invention is to provide a composite sheet or film of the character described as a base for the reception of superimposed stereoscopic prints, the photographic contrast of each of said prints being a function of the direction of vibration of light traversing the sheet or film, and the photographic contrast of one of said prints being a maximum when viewed in light vibrating in a direction such that the photographic contrast of the other of said prints is a minimum.

Other objects of the invention are to provide a composite sheet or film of the character described in which the direction of orientation of the molecules of one layer of the composite sheet may be such that a line indicating that direction meets the edge of the sheet at an angle $a$; to provide such a composite sheet or film where the directions of orientation of the molecules in the two sheets of the composite film are respectively parallel to and at right angles to the edges of the film, and to provide such a composite sheet or film wherein the directions of orientation of the molecules of the two sheet-like elements comprising the composite film are each at angles of 45° to the edge of said film.

Other objects of the invention are to provide sheets or films of the character described of transparent plastic materials from the class consisting of the linear hydrophilic polymers, such for example as polyvinyl alcohol, or polyvinyl acetal, or cellulosic materials, such for example as regenerated cellulose.

Other objects of the invention will be in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a further understanding of the invention, reference should be had to the accompanying drawing, in which.

A preferred material for use in the manufacture of the present invention is polyvinyl alcohol. If a sheet of this material is stretched or extended within the range of from twice to four or five times its original length, as for example by heating the sheet until it softens and then extending it, a substantial orientation of the molecules of the sheet in the direction of stretch or extension is obtained. If the sheet is then dyed or stained, as for example with iodine in the presence of an iodide, or with a direct cotton dye, the dyed or stained portion of the sheet becomes dichroic. If the sheet has been subjected to a printing operation, as for example by applying to it a dye or stain which renders it dichroic, from a relief or a half-tone or the like, then an image corresponding to the image formed in the relief or half-tone plate is produced, the photographic contrast of which is a function of the direction of vibration of light traversing the image.

This is true also where other materials are employed as the base sheet. For example polyvinyl acetal and Cellophane may be subjected to a preliminary stretching treatment to substantially orient their molecules, and they may then be dyed or stained in the manner described to produce in the sheet an image of the character described. Any linear hydrophilic polymeric plastic may be employed.

This invention relates to a specific form of sheet or film comprising a plurality of overlying layers of plastic materials of the character described, and more specifically of polyvinyl alcohol, prepared to receive a dye or stain to produce therein a dichroic image of the character described. In the present invention at least two superimposed sheets of the plastic material are employed. They are bonded together to provide a unitary sheet, and they are so positioned with respect to each other that the directions of orientation of the molecules of one of the two bonded sheets is at right angles to the direction of orientation of the molecules of the other of the two sheets.

Figure 1:
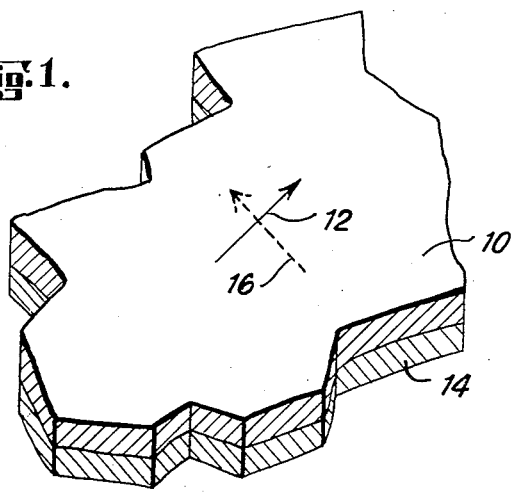
Figure 1 is a view in perspective of a portion of the composite sheet of the present invention.
Figure 5:
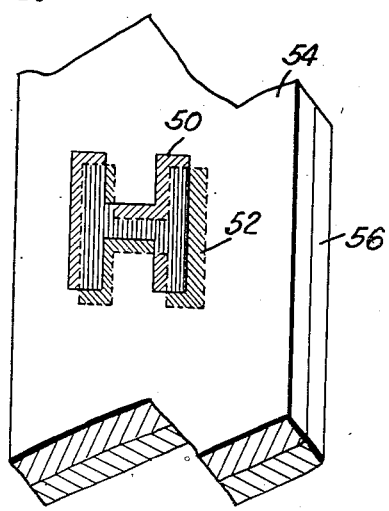
Fig. 5 is a view in perspective showing a pair of stereoscopic images formed in the sheet.

In Fig. 1, for example, 10 designates a sheet of polyvinyl alcohol or other linear hydrophilic polymeric plastic which has been stretched so that its molecules are substantially oriented in the direction shown by the arrow 12, and 14 represents another sheet of this same material which has been stretched or extended so that its molecules are oriented in the direction shown by the arrow 16. It will be apparent that when these two sheets are bonded together a product is obtained which is adapted to receive left-eye and right-eye stereoscopic prints, one on the sheet 10 for example, the other on the sheet 14. In Fig. 5 such prints are shown diagrammatically as at 50 and 52, the print 50 being in the upper sheet 54, the print 52 being in the lower sheet 56. If such a stereoscopic print is viewed through viewing glasses, one lens of which is adapted to pass the image 50 and block the image 52, and the other lens of which is adapted to block the image 50 and pass the image 52, then a true stereoscopic effect may be produced if the images 50 and 52 are respectively right-eye and left-eye images.

The polarizing axis of each image may coincide with the direction of orientation of the molecules of the sheet 10 or 14 in which the image is formed, so that if two images are applied to the sheets 10 and 14, one to the sheet 10 and the other to the sheet 14, the corresponding polarizing axes of these images will lie in directions indicated by the arrows 12 and 16 in Fig. 1, and in the directions indicated by the shade lines of those portions of the images 50, 52 in Fig. 5 which are not overlying.

Figure 2:
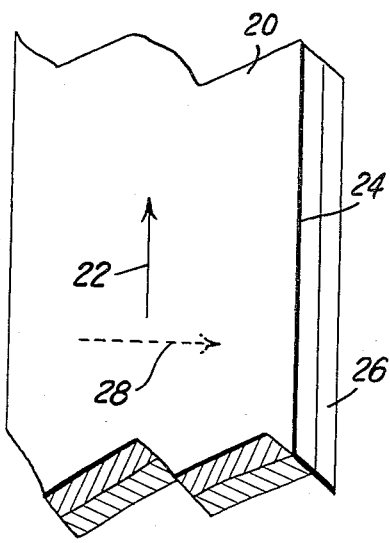
Fig. 2 is a similar view of a modification of the invention in which the directions of orientation of the molecules of the two sheets comprising the composite sheet of the invention are perpendicular and at right angles to a predetermined edge of the film or sheet of the invention.

In Fig. 2 there is shown a portion of a film, for example a motion picture film or other film adapted to receive a print of a left-eye image on one face and a print of a right-eye image on the other face. In this instance the sheet 20 of the composite film shown in Fig. 2 has been extended in the direction indicated by the arrow 22 which is parallel to the edge 24 of the sheet 20. The sheet 26 has been extended in the direction indicated by the arrow 28, which is perpendicular to the edge 24 of the sheet 20. With such a structure, when dichroic images are formed in the sheets, one eye image will show maximum photographic contrast when light is traversing it vibrating in the direction shown by the arrow 28, and the other eye image will show maximum photographic contrast when light is traversing it vibrating in a direction corresponding to the arrow 22. If a sheet of this material be employed in the projection of motion pictures, the viewing glasses used by observers should have their polarizing axes vertical for one lens and horizontal for the other.

Figure 3:
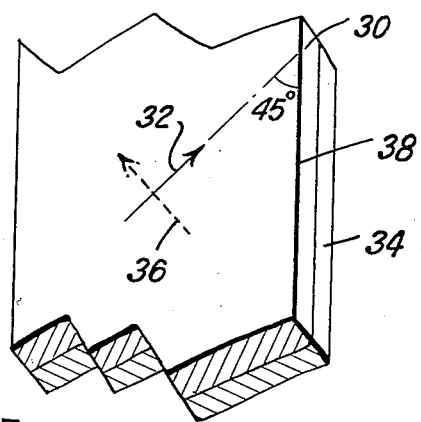
Fig. 3 is a view similar to Fig. 2 in which the directions of orientation of the molecules of the two sheets are at 45° to a predetermined edge.

In Fig. 3 there is shown a modification of the invention in which the sheet 30 has been extended in the direction shown by the arrow 32, and the sheet 34 has been extended in the direction shown by the arrow 36. Here the directions of extension are at angles of 45° to the edge 38 of the composite sheet, and viewing glasses for observing stereoscopic images carried by such a film should have their polarizing axes at 45° to the horizontal and at right angles to each other.

Figure 4:
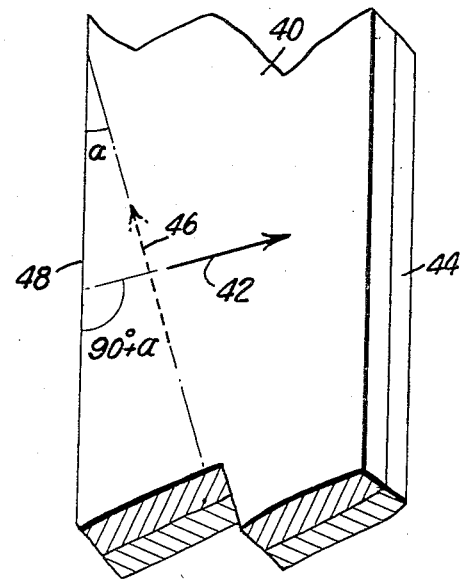
Fig. 4 represents a still more general condition where the directions of orientation are respectively such that they make angles of $a$ and $90°+a$ with a predetermined edge of the sheet.

Fig. 4 illustrates a more general condition where the sheet 40 has been extended in the direction indicated by the arrow 42, and the sheet 44 has been extended in the direction indicated by the arrow 46. These directions of extension or directions of substantial orientation of the molecules of the sheet may make any desired angles with the edge of the sheet 48, and these angles are indicated generally in the drawing as $a$ and $90° + a$.

It will be understood that the composite sheet of the invention may be made from two separate sheets which have been bonded together by means well known to the art, or in the case of the device shown, for example, in Fig. 3, the composite sheet may be formed from a single sheet which is folded back upon itself and then cemented or bonded so as to form a single unitary sheet.

The composite sheet of the present invention is admirably adapted to receive substantially superimposed right and left eye stereoscopic images, one image being formed in one of the overlying layers and the other image being formed in the other of the layers of the composite sheet. Such a device is shown, for example, in Fig. 5, where 54 and 56 represent respectively the two layers of the composite sheet and where 50 represents the stereoscopic print or image formed in the sheet 54, and 52 represents the stereoscopic print or image formed in the sheet 56. These prints or images may preferably be formed by dyeing or staining the sheets, for example with a stain comprising iodine and an iodide, or with a suitable dye which when applied to the sheet renders it dichroic. The direct cotton dyes are, generally speaking, suitable, either alone or in mixtures, as dyes for the formation of said images or prints, and more specifically where the composite sheet is made of polyvinyl alcohol, water-soluble direct cotton dyes of the azo type are suitable.

The dyes selected should be substantive dyes for the linear polymer comprising the composite sheet. Such dyes have elongated molecules containing a system of linear conjugated double bonds uninterrupted at least over the greater part of the length of the molecule, or at most interrupted by a —NH— group.

Where the images appearing in the composite sheet comprise full color stereoscopic prints or images they may be formed, for example, by the use of three dyes, a minus red, a minus green, and a minus blue from the class of dyes previously defined.

Suitable minus red dyes are Niagara Sky Blue 6B and Niagara Blue NR.

Suitable minus green dyes are Solantine Pink 4BL, Solantine Red 8BL, and Geranine GL.

Suitable minus blue dyes are Solantine Yellow 4GL, Solantine Yellow FF, and Stilbene Yellow 3GA.

It will be understood that the dyes listed are not to be deemed inclusive of all dyes which may be used, but are to be deemed merely representative of a wide variety of dyes of the class previously defined.

The images formed by dyeing or staining the composite sheet of the present invention may be formed in the sheet by printing, as from a halftone plate, gelatine relief or the like, with dyes or stains of the character described. The directions of orientation of the molecules of the two overlying layers of the composite sheet control the directions of the dichroic axes of the images formed therein. In Fig. 5, for example, the image 50, over such portions thereof as do not overlie the image 52, is shaded to indicate a polarizing axis extending from upper right to lower left at an angle of 45° to the edges of the two layers 54, 56. The image 52 is shaded to indicate a polarizing axis extending in a direction at right angles to that of the image 50. Where the images overlie, i. e., where their axes are crossed, the shading is represented as vertical.

It will be apparent that a preferred embodiment of the invention is one shown, for example, in Fig. 3 and Fig. 5, where the directions of orientation of the molecules of the two layers comprising the composite sheet of the present invention are at 45° to the edges of the sheet. With such a structure it makes no difference which of the two layers is held adjacent the observer in viewing the stereoscopic images, for the sheets bearing the stereoscopic images, i. e., sheets such as are shown in Fig. 5, will give a truly stereoscopic effect when viewed through suitable analyzers whether they are viewed from either the upper or the lower surface. Reversal of the sheet in the hand of a person viewing the images will not give a pseudo-stereoscopic image, but will rather give a stereoscopic image which is a mirror image of that obtained by viewing the sheet from the other surface. With devices of this kind eye-strain is avoided and pseudo-stereoscopy eliminated, irrespective of the surface from which the user may view the images carried by the sheet.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. As a new article of manufacture, a composite sheet comprising a plurality of overlying layers of polyvinyl alcohol, the molecules of each of said layers being substantially oriented, the direction of orientation of the molecules of one of said layers being at right angles to the direction of orientation of the molecules of the other of said layers, said layers being bonded together, each surface of said composite sheet having the property of absorbing and molecularly orienting dichroic dyes and stains used in the production of dichroic light-polarizing images.

2. As a new article of manufacture, a composite sheet comprising a plurality of overlying layers of a linear hydrophilic polymeric plastic, the molecules of each of said layers being substantially oriented, the direction of orientation of the molecules of one of said layers being at right angles to the direction of orientation of the molecules of the other of said layers, said layers being bonded together, the directions of orientation of the molecules of each of said layers making angles of 45° with an edge of said sheet, each surface of said composite sheet having the property of absorbing and molecularly orienting dichroic dyes and stains used in the production of dichroic light-polarizing images.

3. As a new article of manufacture, a transparent sheet comprising a plurality of layers of polyvinyl alcohol bonded together, molecules in one of said layers being substantially oriented in a direction at right angles to the direction of orientation of molecules in the other of said layers, said directions of orientation making angles of 45° with the edges of said sheet, each surface of said composite sheet having the property of absorbing and molecularly orienting dichroic dyes and stains used in the production of dichroic light-polarizing images.

4. As a new article of manufacture, a plurality of superimposed sheets of a transparent linear hydrophilic polymeric plastic, said sheets being bonded together, one of said sheets having its molecules substantially oriented in a direction making an angle of 45° with the edges of said sheet, predetermined areas of said sheet dyed with a dichroic dye and showing in polarized light an image the photographic contrast of which is a function of the direction of vibration of said polarized light, the other of said sheets having its molecules substantially oriented in a direction at right angles to the direction of orientation of the molecules of the first said sheet, predetermined areas of said second named sheet being dyed with a dichroic dye and showing in polarized light an image the photographic contrast of which is a function of the direction of vibration of said light, the images carried by said sheets being respectively left and right eye stereoscopic images, one of said images showing a maximum photographic contrast in predeterminedly vibrating polarized light, the other of said images showing a minimum photographic contrast in said light.

5. As a new article of manufacture, a plurality of superimposed sheets of polyvinyl alcohol, said sheets being bonded together, one of said sheets having its molecules substantially oriented in a direction making an angle of 45° with the edges of said sheet, predetermined areas of said sheet dyed with a dichroic dye and showing in polarized light an image the photographic contrast of which is a function of the direction of vibration of said polarized light, the other of said sheets having its molecules substantially oriented in a direction at right angles to the direction of orientation of the molecules of the first said sheet, predetermined areas of said second named sheet being dyed with a dichroic dye and showing in polarized light an image the photographic contrast of which is a function of the direction of vibration of said light, the images carried by said sheets being respectively left and right eye stereoscopic images, one of said images showing a maximum photographic contrast in predeterminedly vibrating polarized light, the other of said images showing a minimum photographic contrast in said light.

6. As a new article of manufacture, a transparent sheet comprising a plurality of layers of polyvinyl alcohol bonded together, the molecules in the layer on one surface of said sheet being oriented in a predetermined direction, the molecules in the layer on the other surface of said sheet being oriented in a direction substantially at right angles to the direction of molecular orientation in said first named layer, each surface of said composite sheet having the property of absorbing and molecularly orienting dichroic dyes and stains used in the production of dichroic light-polarizing images.

EDWIN H. LAND.